United States Patent
Hayashi

(10) Patent No.: US 8,459,895 B2
(45) Date of Patent: Jun. 11, 2013

(54) POWER TRANSMISSION DEVICE AND ASSEMBLING METHOD THEREOF

(75) Inventor: Hideki Hayashi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/552,934

(22) Filed: Jul. 19, 2012

(65) Prior Publication Data

US 2013/0035192 A1    Feb. 7, 2013

(30) Foreign Application Priority Data

Aug. 3, 2011  (JP) ................................. 2011-169990

(51) Int. Cl.
*F16D 1/08* (2006.01)

(52) U.S. Cl.
USPC ........... 403/345; 403/355; 123/399; 123/337; 251/305; 251/308

(58) Field of Classification Search
USPC ........... 403/345, 355; 123/337, 399; 251/305, 251/308
See application file for complete search history.

(56) References Cited

U.S. PATENT DOCUMENTS

| | | | | |
|---|---|---|---|---|
| 4,261,668 A | * | 4/1981 | Rigal | 403/319 |
| 4,938,731 A | * | 7/1990 | Nguyen et al. | 464/158 |
| 5,048,366 A | * | 9/1991 | Spanio | 74/567 |
| 5,188,078 A | * | 2/1993 | Tamaki | 123/403 |
| 5,499,884 A | * | 3/1996 | Kuhnhold et al. | 403/359.5 |
| 5,667,332 A | * | 9/1997 | Lindholm | 403/359.5 |
| 6,558,261 B1 | * | 5/2003 | Nelson | 464/89 |
| 8,042,680 B2 | * | 10/2011 | Pottmann | 198/677 |
| 2006/0017036 A1 | * | 1/2006 | Rauch et al. | 251/305 |
| 2006/0157663 A1 | * | 7/2006 | Rauch et al. | 251/305 |

FOREIGN PATENT DOCUMENTS

| JP | 6-248979 | * | 9/1994 |
|---|---|---|---|
| JP | 2001-248449 | | 9/2001 |

OTHER PUBLICATIONS

U.S. Appl. No. 13/293,299, filed Nov. 10, 2011, Hayashi.

* cited by examiner

*Primary Examiner* — Erick Solis
(74) *Attorney, Agent, or Firm* — Nixon & Vanderhye, PC

(57) ABSTRACT

An impact absorber is arranged between a first rotation member and a second rotation member that are coaxially arranged to rotate in a circumference direction around a rotation axis. The first rotation member has a recess continuously extending in a direction inclined to the rotation axis from a first end to a second end, and a lock part extending in the circumference direction from the second end of the recess. The second rotation member has a projection configured to be engaged with the recess continuously from the first end of the recess to the second end of the recess. The projection of the second rotation member is locked with the lock part of the first rotation member when the projection moves to the lock part from the second end of the recess.

10 Claims, 9 Drawing Sheets

POWER TRANSMISSION DEVICE AND ASSEMBLING METHOD THEREOF

CROSS REFERENCE TO RELATED APPLICATION

This application is based on and incorporates herein by reference Japanese Patent Application No. 2011-169990 filed on Aug. 3, 2011.

TECHNICAL FIELD

The present disclosure relates to a power transmission device and an assembling method of the power transmission device.

BACKGROUND

JP2001-248449A describes a power transmission device that transmits a rotation power of a motor to a shaft of a valve device. The valve device has a valve supported by the shaft so as to control intake air.

As shown in FIG. 9, the power transmission device includes a worm gear (not shown) fixed to an output shaft of the motor, a helical gear 101 meshing with the worm gear, a spur gear 102 located coaxially with the helical gear 101, and an output gear (not shown) meshing with the spur gear 102. An impact absorbing member has a first plate 103, a second plate 104 and a rubber portion 105, and is disposed between the helical gear 101 and the spur gear 102, to rotate integrally with the helical gear 101 and the spur gear 102.

The rubber portion 105 is inserted between the first plate 103 and the second plate 104, and is vulcanized-bonded to the first and second plates 103 and 104. The rubber portion 105 is twisted in use. Thus, a deformation amount of the impact absorbing member increases, so that an impact absorbing performance is ensured. Therefore, a lock of the worm gear can be prevented by the twisting effect of the impact absorbing member when the valve bumps into a fully-close stopper.

However, in this case, the number of components and assembly man-hours are large. As a result, production cost becomes high. Further, positioning deviation may be generated among the components.

SUMMARY

It is an object of the present disclosure to provide a power transmission device and an assembling method of the power transmission device so as to reduce the number of components and to restrict positioning deviation among the components.

According to an example of the present disclosure, a power transmission device that transmits a rotation power from a drive source to a driven object includes: a first rotation member and a second rotation member coaxially arranged to rotate in a circumference direction around a rotation axis relative to each other; and an impact absorber made of rubber and arranged between the first rotation member and the second rotation member to have elastic deformation in a twist direction centering on the rotation axis. The first rotation member has a recess continuously extending in a direction inclined to the rotation axis from a first end to a second end, and a lock part extending in the circumference direction from the second end of the recess. The second rotation member has a projection to be engaged with the recess continuously from the first end to the second end of the recess. The projection is locked with the lock part when the projection moves to the lock part from the second end of the recess.

Accordingly, positioning deviation can be restricted with the simple construction.

According to an example of the present disclosure, an assembling method of the power transmission device includes performing a position alignment of the projection relative to the first end of the recess, and rotating the first rotation member and the second rotation member relative to each other before the projection reaches the lock part from the second end of the recess so as to integrally assemble the first rotation member, the second rotation member and the impact absorber.

Accordingly, the assembling method of the power transmission device can be made simple and positioning deviation can be restricted with the simple construction.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE DRAWINGS

Figure 1:
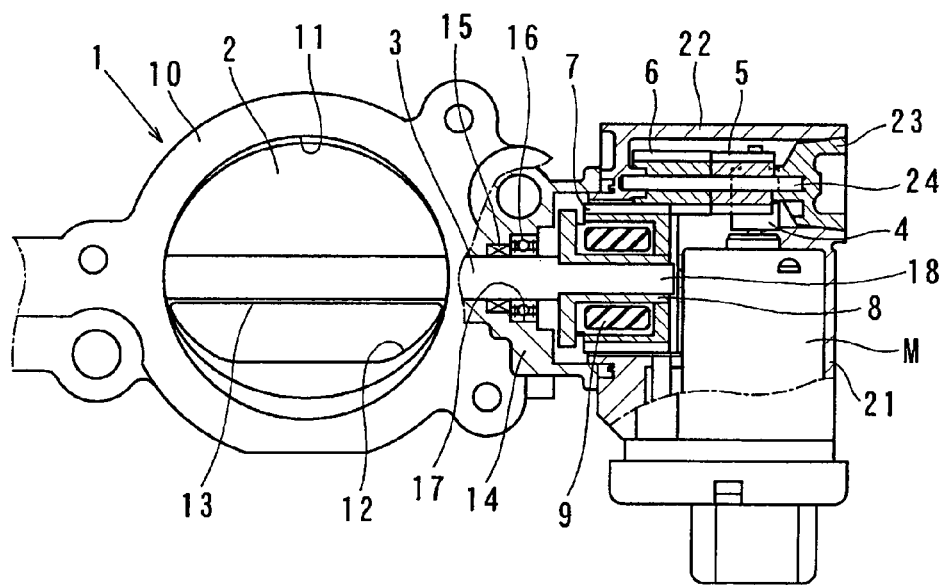
FIG. 1 is a sectional view illustrating a power transmission device according to a first embodiment in an air intake system for an internal combustion engine.
Figure 2:
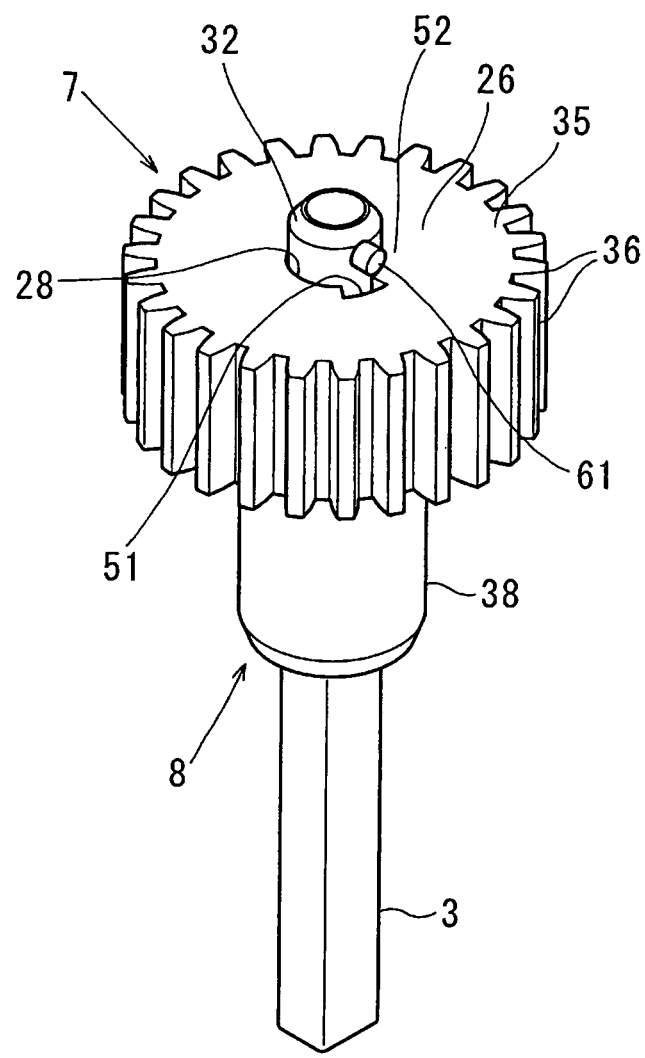
FIG. 2 is a perspective view illustrating the power transmission device.

Embodiments of the present invention will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A first embodiment will be described with reference to FIGS. 1 to 6B.

In the first embodiment, an air intake system of an internal combustion engine has an electronic throttle device and a vortex flow generating device. The electronic throttle device controls a flow rate of intake air drawn into a combustion chamber and an intake port by opening and closing a throttle valve. The vortex flow generating device deflects a flow of intake air flowing downstream of the electronic throttle device upward, thus vortex flow is generated in the combustion chamber. The vortex flow is made to swirl in a vertical direction, and is referred as tumble flow hereinafter.

The engine is, for example, a multi-cylinder gasoline engine producing an output using thermal energy obtained by combusting air-fuel mixture in the combustion chamber. Alternatively, the engine may be a multi-cylinder diesel engine.

In the engine, plural cylinders (cylinder bores) and plural combustion chambers are arranged in series in a cylinder arrangement direction. The engine has a cylinder head and a cylinder block defining an intake port opened or closed by an intake valve and an exhaust port opened or closed by an exhaust valve.

Spark plugs are attached to the cylinder heads of the engine such that an end part of the spark plug is exposed to inside of the combustion chamber. Injectors (e.g., electromagnetic fuel injection valves), which respectively inject fuel into the intake ports at opportune timing, are also attached to the cylinder head. The cylinder bore slidably supports a piston in a slide (reciprocation) direction of the piston. The piston is connected to a crankshaft via a connecting rod.

The intake ports are respectively connected to intake pipes (intake ducts) for supplying intake air to each combustion chamber of the cylinders of the engine. The exhaust ports are respectively connected to exhaust pipes (exhaust ducts) for emitting exhaust gas from each combustion chamber of the cylinders of the engine to outside.

The engine further includes an air cleaner in addition to the electronic throttle device and the vortex flow generating device. The air cleaner has a filter element that filters the intake air introduced into an introduction passage from an introduction port that is open at the upstream end of the intake duct. An outlet end of the air cleaner is connected to a throttle body of the electronic throttle device through the intake duct (made of rubber hose etc.) that defines an intake passage through which the intake air flows after passing through the air cleaner. An outlet end of the throttle body is connected to the intake port of the cylinder of the engine through an intake manifold that defines an intake passage through which the intake air flows after passing through the throttle body.

The vortex flow generating device includes the throttle body, a throttle valve, a shaft, an actuator, and a throttle sensor. The throttle body is connected to the outlet end of the air cleaner. The throttle valve is accommodated to open or close the inside of the throttle body. The shaft supports the throttle valve. The actuator causes the throttle valve to be opened or closed by rotating the shaft. The throttle sensor detects a throttle opening that represents a rotation angle of the shaft. The vortex flow generating device is used as an intake control device of the internal combustion engine, which controls intake air supplied to the combustion chamber of each cylinder of the engine based on the throttle opening that corresponds to a valve opening of the throttle valve.

The vortex flow generating device is disposed in an engine compartment of a vehicle together with the electronic throttle device, and includes an intake manifold (duct) 1 and an intake (tumble) control valve. Intake air flows into the intake duct 1 made of synthetic resin from the throttle body or a surge tank. The control valve controls the tumble flow generated in the combustion chamber. Accordingly, a vortex flow (e.g., a tumble flow or a swirl flow) is generated in each combustion chamber of the cylinders of the engine.

The control valve includes plural plate valves 2, a metal shaft 3 and an actuator having a motor M as a drive source. The plate valves 2 are rotatably arranged inside of the intake duct 1, and are supported by the shaft 3. Opening angles of the plate valves 2 are controlled by the actuator at the same time.

The actuator is fixed to an external wall of the intake duct 1, and includes a power transmission device that transfers torque of the motor M to the shaft 3 supporting the plate valves 2 to be driven. The power transmission device includes a speed reduction mechanism and a torque transmission mechanism. The speed reduction mechanism decreases a rotational rate of the motor M, and the torque transmission mechanism transfers the torque of the motor M from an output gear 7 (last gear) to the shaft 3. The torque transmission mechanism may be referred as a coupling mechanism.

The speed reduction mechanism includes a worm gear 4, a helical gear 5, and a spur gear 6. The worm gear 4 is fixed to an output shaft (motor shaft) of the motor M, and the helical gear 5 meshes with the worm gear 4 to rotate. The spur gear 6 is disposed coaxially with the helical gear 5. For example, an axis of the spur gear 6 may be on the same line as an axis of the helical gear 5.

The coupling mechanism coaxially includes the above-described output gear 7 (first rotation member), a joint 8 (second rotation member), and a rubber cushion 9 (impact absorber). The rubber cushion 9 is arranged between the output gear 7 and the joint 8 that are rotatable relative to each other.

The output gear 7 is made of synthetic resin or metal, and is driven by the motor M. The joint 8 is fixed to the shaft 3 so as to rotate with the shaft 3 simultaneously, not relatively. The cushion 9 is made of synthetic rubber (elastomer) and is held between the output gear 7 and the joint 8 to absorb an impact (load) applied to the output gear 7 or the joint 8.

The duct 1 is integrally formed of synthetic resin and is a part of the intake manifold. The duct 1 defines more than one intake passage (independent intake passage) therein. The number of the independent intake passages inside the duct 1 corresponds to the number of the cylinders. The independent intake passages are respectively connected to the intake ports provided in the cylinder head of the engine.

The duct 1 includes plural cylindrical parts more than one (surrounding wall parts) 10 which are positioned at outer peripheries of the independent intake passages respectively. A flange is integrally formed with each cylindrical part 10 at a downstream end portion of each cylindrical part 10 in a flow direction of air. The flange has a coupling end surface to be fastened and fixed to a coupling end surface of the cylinder head by using a fastening bolt or the like. The cylindrical part 10 is elongated in an axis direction of the duct 1 (in an axis direction of the independent intake passage). A bulkhead 13 is integrally formed with each cylindrical part 10 of the duct 1. The bulkhead 13 air-tightly separates the independent intake passage into a first intake passage 11 and a second intake passage 12 in the flow direction of air. In the embodiment, each first intake passage 11 is opened or closed by opening or closing each valve 2.

The duct 1 includes a first holding part 14 on one side of the shaft 3 in the rotation axis direction of the shaft 3. The duct 1 further includes a second holding part (not shown) on the other side of the shaft 3 in the rotation axis direction of the shaft 3.

The first holding part 14 defines a first bearing hole 17. The first bearing hole 17 rotatably supports a first sliding part on the one side of the shaft 3 in the rotation axis direction of the shaft 3 via a first bearing member. The first bearing member includes an oil seal 15 and a bearing 16.

The second holding part defines a second bearing hole. The second bearing hole rotatably supports a second sliding part on the other side of the shaft 3 in the rotation axis direction of the shaft 3 via a second bearing member (bearing).

The valves 2 are integrally formed of synthetic resin. These valves 2 are rotation valves which are connected to (immovably-supported by) the shaft 3, such that the single shaft 3 is inserted into the valves 2.

The first intake passages 11 are respectively opened or closed by rotating each valves 2 relative to the duct 1, namely, by varying a rotation angle (open degree) of each valve 2 in an operation range from a fully-open position to a fully-close position. When each valve 2 is at the fully-open position, an opened cross-sectional area of each first intake passage 11 is the largest area. When each valve 2 is in the fully-close position, the opened cross-sectional area of each first intake passage 11 is the smallest area. In this case, each valve 2 throttles the cross-sectional area of each first intake passage 11.

The valves 2 are fully opened by utilizing torque of the electrical actuator, specifically the motor M, when the engine is in normal operation. In this case, the open degrees of the valves 2 are controlled to become a fully-open state (the fully-open position). In other words, the valves 2 are driven in a fully opening direction.

The fully-open position of the valves 2 is in a state where each first intake passage 11 defined in the cylindrical parts 10 of the duct 1 is fully opened. The fully-open position is an end position on one side of the operation range of each valve 2, i.e., an opening-side limitation position, where a fully-open stopper part (described later) of the joint 8 bumps into a fully-open stopper (not shown) provided in the duct 1 and a further movement of each valve 2 in the fully opening direction is limited. The joint 8 is coupled to the valves 2 via the shaft 3 to be integrally rotated with the valves 2. The valves 2 may be biased in the fully opening direction by a biasing force such as a spring, so that all the valves 2 are positioned at the fully-open position.

The valves 2 are fully closed by utilizing torque of the electrical actuator, specifically the motor M, when the engine starts or is in idling. In this case, the open degrees of the valves 2 are controlled to become a fully-close state (the fully-close position). In other words, the valves 2 are driven in a fully closing direction.

The fully-close position of the valves 2 is in a state where each first intake passage 11 defined in each cylindrical part 10 of the duct 1 is fully closed. The fully-close position is an end position on the other side of the operation range of each valve 2, i.e., an closing-side limitation position, where a fully-close stopper part (described later) of the joint 8 bumps into a fully-close stopper (not shown) provided in the duct 1 and a further movement of each valve 2 in the fully closing direction is limited. The valves 2 may be biased in the fully closing direction by a biasing force such as a spring, so that all the valves 2 are positioned at the fully-close position.

The shaft 3 linearly extends in its rotation axis direction that is parallel to the arrangement direction of the independent intake passages of the cylinders of the engine. The shaft 3 is a polygonal-cross-sectional shaft (e.g., square steel shaft), which is formed such that a sectional surface perpendicular to the rotation axis direction of the shaft 3 has a polygonal shape. For example, the shaft 3 is integrally formed by using iron-based steel. The first and second sliding parts of the shaft 3 have round shapes in sectional surfaces perpendicular to the rotation axis direction of the shaft 3.

The shaft 3 is press-fitted into shaft-fitting holes of the valves 2. The shaft-fitting holes have polygonal shapes in cross-section and are respectively formed in rotational center parts of the valves 2. The single shaft 3 connects the rotational center parts of the valves 2 to each other in a skewer state, such that the valves 2 interlock with each other.

Moreover, the shaft 3 varies the opening degrees of the valves 2 and is press-fitted and fixed to wall surfaces of the shaft-fitting holes of the valves 2. Thus, the rotary shaft 3 can support and fix the valves 2.

The first sliding part of the shaft 3 is supported in the first bearing hole 17 of the duct 1 via the oil seal 15 and the bearing 16 of the first bearing member to be able to slide in a rotational direction of the shaft 3.

The second sliding part of the shaft 3 is supported in the second bearing hole of the duct 1 via the second bearing member to be able to slide in the rotational direction of the shaft 3.

A protrusion part, which projects from the first sliding part of the shaft 3 to one side of the shaft 3 in the rotation axis direction of the shaft 3, is used as an insertion part 18 that is inserted into and supports the joint 8 of the coupling mechanism. The insertion part 18 has a polygonal (e.g., quadrangle) shape in a sectional surface perpendicular to the rotation axis direction of the shaft 3.

The actuator includes the motor M and the power transmission device. The motor M generates a driving force (torque) by receiving supply of electric power to activate the valves 2. The power transmission device transfers the torque of the motor M to the shaft 3.

The power transmission device includes the speed reduction mechanism, the coupling mechanism and an actuator case defining an accommodation chamber accommodating the speed reduction mechanism and the coupling mechanism. The speed reduction mechanism reduces the rotation speed of the engine M to have a predetermined reduction ratio. The coupling mechanism is defined by integrally assembling the output gear 7, the joint 8 and the rubber cushion 9.

The actuator case accommodates the motor M and the power transmission device, and includes a motor housing 21, a gear housing 22, and a plug 23. The motor housing 21 contains and holds the motor M, and the gear housing 22 accommodates the power transmission device. The plug 23 fills an opening part of the gear housing. The motor housing 21 and the gear housing 22 are integrally formed of synthetic resin with each other.

The motor M is disposed and held in a motor storage space of the motor housing 21. The motor M is electrically connected to a battery (external power source) through a motor drive circuit which is electrically controlled by an engine control unit (e.g., engine control device, electronic control unit: hereinafter ECU). The battery is installed in the vehicle such as an automobile.

The speed reduction mechanism includes the worm gear 4, the helical gear 5, and the spur gear 6. These gears 4 to 6 are rotatably contained in a gear storage space of the gear housing 22.

Figure 9:
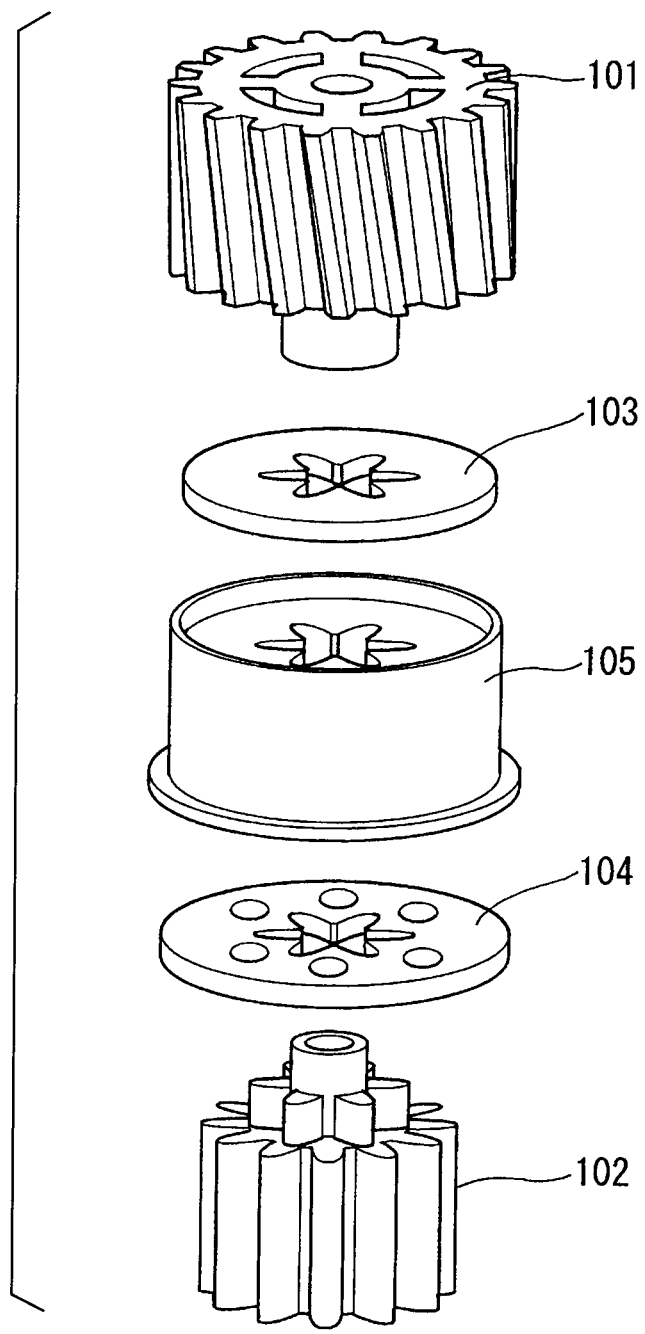
FIG. 9 is a disassembled perspective view illustrating a power transmission device of a conventional art.

The worm gear 4 is press-fitted and fixed to a circumferential surface of the motor shaft. The helical gear 5 and the spur gear 6 are rotatably supported by a circumferential surface of a gear shaft 24 which is disposed perpendicular to an axial direction of the motor shaft of the motor M. The spur gear 6 is directly connected to the helical gear 5. Therefore, it is unnecessary to provide a rubber component (corresponding to the rubber portion 105 of FIG. 9) between the helical gear 5 and spur gear 6.

The helical gear 5 includes a cylindrical-shaped boss part which surrounds the gear shaft 24 in a circumferential direction of the gear shaft 24. Over an outer periphery of the boss part of the helical gear 5, protrusion teeth, which mesh with the worm gear 4, are formed (arranged) in a circumferential direction of the boss part.

The spur gear 6 also includes a boss part which surrounds the gear shaft 24 in the circumferential direction of the gear shaft 24. Over an outer periphery of the boss part of the spur gear 6, protrusion teeth (super gear teeth), which mesh with the output gear 7, are formed (arranged) in a circumferential direction of the boss part of the spur gear 6.

The output gear 7 and the joint 8 are integrally-molded from synthetic resin individually. The output gear 7 and the joint 8 transmit torque of the motor M from the spur gear 6 to the rotary shaft 3 via the cushion 9.

The output gear 7 and the joint 8 include a first facing part 26 and a second facing part 27 respectively. The first facing part 26 of the output gear 7 faces the second facing part 27 of the joint 8 across a cushion storage space where the cushion 9 is contained. For example, the cushion storage space is an interspace (space) extending by a predetermined distance (axial distance) parallel to the rotation axis direction of the shaft 3.

The output gear 7 has a through hole 28 straightly extending in the rotation axis direction of the coupling mechanism.

Figure 4:
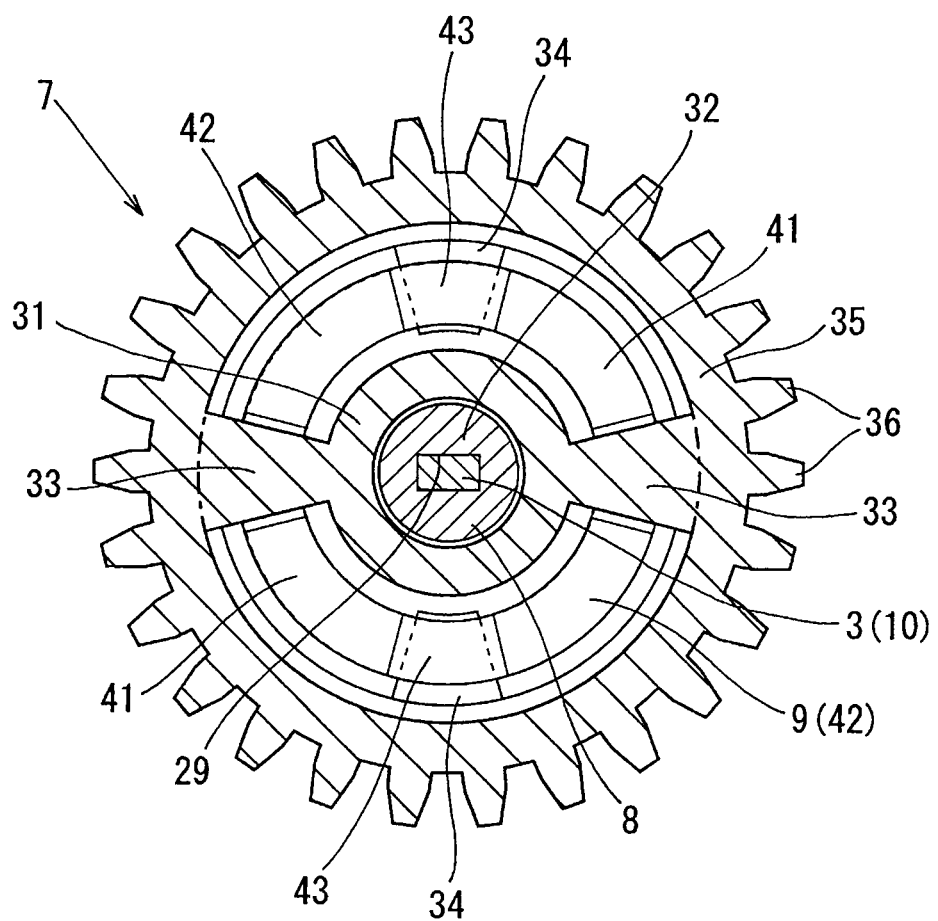
FIG. 4 is a sectional view illustrating the power transmission device.

The joint 8 has a press-fit hole 29, as shown in FIG. 4, into which the insertion part 18 of the shaft 3 is fitted, on the rotation axis direction of the coupling mechanism.

The first facing part 26 of the output gear 7 is provided with a facing surface which faces the second facing part 27 of the joint 8 with a predetermined distance (axial distance) therebetween. The second facing part 27 of the joint 8 is provided with a facing surface which faces the first facing part 26 of the output gear 7 with the predetermined distance (axial distance) therebetween.

A first cylindrical part 31 is integrally formed with the first facing part 26 at a center part of the facing surface of the first facing part 26. Also, a second cylindrical part 32 is integrally formed with the second facing part 27 at a center part of the facing surface of the second facing part 27.

The first cylindrical part 31 projects from the facing surface of the first facing part 26 toward the second facing part 27. The second cylindrical part 32 projects from the facing surface of the second facing part 27 toward the first facing part 26.

The first cylindrical part 31 has a cylindrical shape to surround the second cylindrical part 32 in a circumferential direction of the second cylindrical part 32. The first facing part 26 and the first cylindrical part 31 are rotatably fitted to an outer periphery of the second cylindrical part 32. The round-shaped through hole 28 is defined in the first facing part 26 and the first cylindrical part 31.

The second cylindrical part 32 has a function as a pivot which supports the first cylindrical part 31 of the output gear 7 such that the cylindrical part 31 is slidable in the rotational direction. Accordingly, the output gear 7 is connected to the joint 8 to be able to relatively rotate to the joint 8.

The press-fit hole 29 having a polygonal (e.g., quadrangle) shape in cross-section is defined in the second facing part 27 and the second cylindrical part 32.

As shown in FIG. 4, the output gear 7 and the joint 8 include plural (e.g., two in this embodiment) first protrusions 33 and plural (e.g., two in this embodiment) second protrusions 34 respectively, which are alternately located in the circumferential direction of the coupling mechanism (e.g., the output gear 7 and the joint 8).

The first protrusions 33 are radially disposed at a radially outer side of the first cylindrical part 31 to project from the facing surface of the first facing part 26 toward the second facing part 27.

The second protrusions 34 are radially disposed at a radially outer side of the second cylindrical part 32 to project from the facing surface of the second facing part 27 toward the first facing part 26.

A cylindrical-shaped teeth forming part (outer cylindrical part, third cylindrical part) 35 is integrally formed with the output gear 7 on a radially outer side of the first facing part 26 of the output gear 7 to surround the first cylindrical part 31 in a circumferential direction of the first cylindrical part 31. The cushion storage space is defined inside the teeth forming part 35. Over an outer periphery of the teeth forming part 35, protrusion teeth (output gear teeth) 36 are formed (arranged) in a circumferential direction of the teeth forming part 35. The protrusion teeth 36 of the output gear 7 mesh with the protrusion teeth of the spur gear 6.

The first facing part 26 of the output gear 7 has an annular shape to close an opening of one side (upper side in FIG. 3) of the output gear 7 in an axial direction of the output gear 7.

The first protrusions 33 project radially from an inner circumferential surface of the teeth forming part 35 toward an outer circumferential surface of the first cylindrical part 31, namely, from outer side toward inner side of the cushion storage space in a radial direction of the output gear 7. The first protrusions 33 project from a bottom surface (down end surface in FIG. 3) of the first facing part 26 toward the other side (down side in FIG. 3) in the axial direction of the output gear 7. The first protrusions 33 are disposed at constant predetermined interval (e.g., 180° or 120°) in the circumferential direction of the coupling mechanism. The first protrusions 33 are respectively inserted and located between adjacent two of the second protrusions 34 in the circumferential direction.

Figure 3:
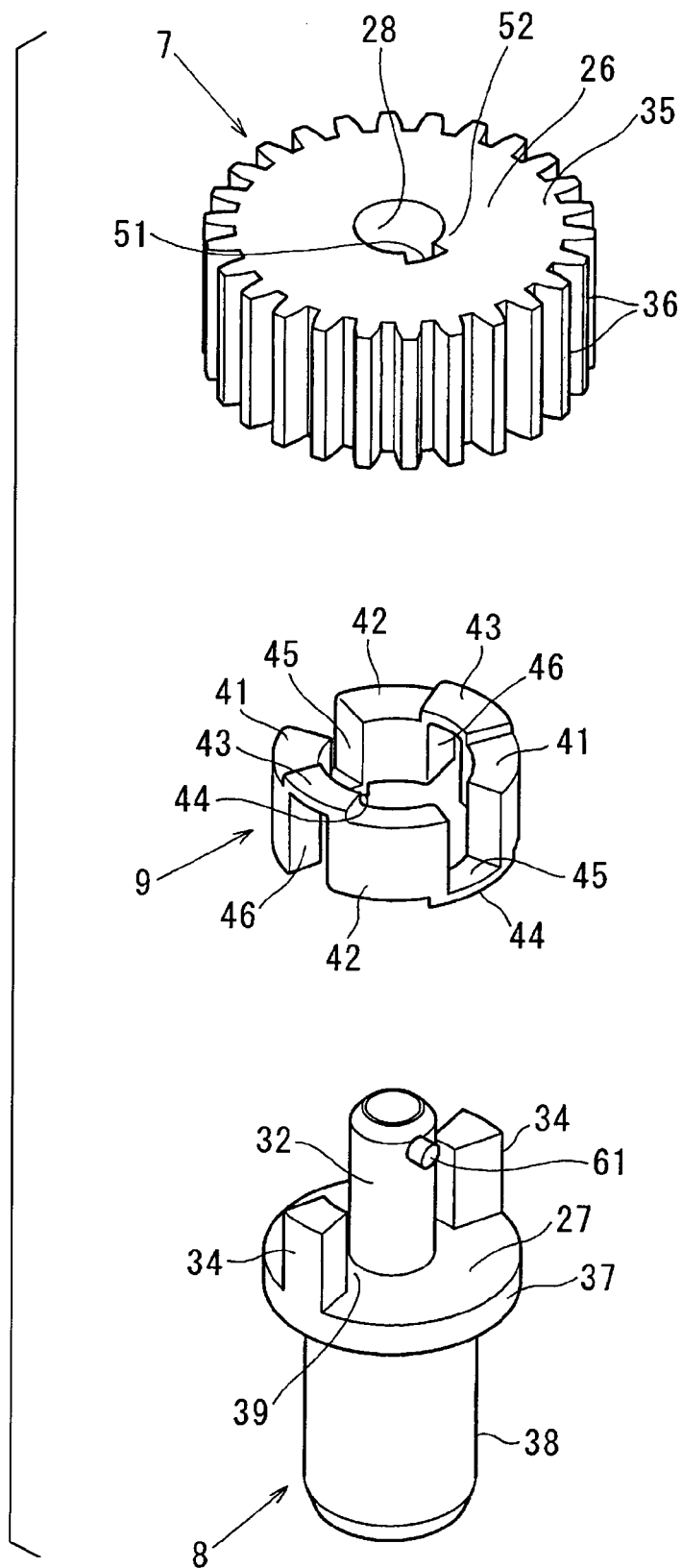
FIG. 3 is a disassembled perspective view illustrating the power transmission device.

As shown in FIG. 3, the joint 8 is integrally formed with a base plate 37 and a cylindrical sleeve 38. On a surface (upper end surface in FIG. 3) of the base plate 37, the round-shaped second facing part 27 is disposed.

The sleeve 38 projects from a rear surface (down end surface in FIG. 3) of the base plate 37 toward a valve side (i.e., the side opposite to a projection direction of the second cylindrical part 32).

The second cylindrical part 32 and the cylindrical sleeve 38 form a part of a cylindrical-shaped wall portion which extends in the rotation axis direction of the rotary shaft 3 and surrounds the insertion part 18 of the shaft 3 in a circumferential direction of the insertion part 18.

On an outer periphery of the sleeve 38, a first protrusion line part and a second protrusion line part may be integrally formed with the sleeve 38. The first and second protrusion line parts project radially outward from the sleeve 38, and are located at a predetermined interval in the circumference direction. One of the protrusion line parts may have a function as the fully-close stopper part which is engaged with the fully-close stopper of the duct 1 when the valves 2 are fully closed. The other one of the protrusion line parts may have a function as the fully-open stopper part which is engaged with the fully-open stopper of the duct 1 when the valves 2 are fully opened.

As shown in FIG. 3, the second protrusions 34 project from a surface (upper end surface in FIG. 3) of the second facing part 27 toward the one side (upper side in FIG. 3) in the axial direction of the output gear 7. The second protrusions 34 are disposed at predetermined constant interval (e.g., 180° or 120°) in the circumferential direction of the coupling mechanism. The second protrusions 34 are respectively inserted and arranged between neighboring two of the first protrusions 33.

An annular-shaped insertion recessed part 39 is formed between an outer circumferential surface of the second cylindrical part 32 of the joint 8 and inner surfaces of the second protrusions 34 in a radial direction of the joint 8. The first cylindrical part 31 of the output gear 7 is inserted into the insertion recessed part 39.

For example, the cushion 9 may be composed only of an elastomer which is integrally formed of synthetic rubber (Hydrogenated Nitrile Butadiene Rubber: H-NBR) or the like.

As shown in FIG. 3, the cushion 9 includes plural elastic parts 41 and 42, first connection parts 43, and second connection parts 44. As shown in FIG. 4, each of the plural elastic parts 41, 42 is located between the first protrusion 33 and the second protrusion 34 located adjacent with each other in the circumferential direction of the coupling mechanism.

The first connection part 43 is referred as a bridge that connects the adjacent elastic parts 41 and 42 with each other, and is located adjacent to the output gear 7 (upper side in FIG. 3). The second connection part 44 is referred as a bridge that connects the adjacent elastic parts 41 and 42 with each other, and is located adjacent to the joint 8 (down side in FIG. 3).

The elastic parts 41 are made of rubber which can be compressed and deformed in a twist direction centering on the rotation axis direction of the coupling mechanism. Each of the elastic parts 41 is inserted and located between adjacent first and second protrusions 33 and 34 in the circumferential direction. Furthermore, the elastic parts 41 are held between the first facing part 26 of the output gear 7 and the second facing part 27 of the joint 8 to be elastically deformable in the cushion accommodation space.

The elastic parts 42 are made of rubber which can be compressed and deformed in the twist direction centering on the rotation axis direction of the coupling mechanism. Each of the elastic parts 42 is inserted and located between adjacent first protrusions 33 and 34 in the circumferential direction. The elastic parts 42 are held between the first facing part 26 of the output gear 7 and the second facing part 27 of the joint 8 to be elastically deformable in the cushion accommodation space.

Each of the first connection parts 43 is a bridge which connects one side end parts (upper end parts in FIG. 3) of adjacent elastic parts 41 and 42 in the rotation axis direction to each other. Similar to the elastic parts 41 and 42, the first connection part 43 also is compressively deformable in the circumferential direction (twist direction) of the coupling mechanism.

Each of second connection parts 44 is a bridge which connects the other side end parts (down end parts in FIG. 3) of adjacent elastic parts 41 and 42 in the rotation axis direction to each other. Similar to the elastic parts 41 and 42 and the first connection part 43, the second connection part 44 also is compressively deformable in the circumferential direction (twist direction) of the coupling mechanism.

A space surrounded by the elastic parts 42, 41 and the second connection part 44 works as a fitting concave 45 to which the first protrusion 33 of the output gear 7 is fitted. A space surrounded by the elastic parts 41, 42 and the first connection part 43 works as a fitting concave 46 to which the second protrusion 34 of the joint 8 is fitted.

The power transmission device has the speed reduction mechanism rotated by the motor M, and the coupling mechanism which combines an output unit of the last gear of the speed reduction mechanism to an input unit of the shaft 3 supporting the plate valves 2.

The speed reduction mechanism has the worm gear 4, the helical gear 5, and the spur gear 6 which are rotatably arranged in the gear storage chamber of the gear housing 22.

The coupling mechanism is constructed by the output gear 7 made of synthetic resin (or metal), the joint 8 made of synthetic resin (or metal), and the rubber cushion 9, which are rotatably arranged in the gear storage chamber of the gear housing 22, together with the shaft 3 supporting and fixing the plate valves 2.

In addition, the rotation axis of the coupling mechanism corresponds to the rotation axis of the output gear 7 corresponding to a first rotation member and the joint 8 corresponding to a second rotation member.

The output gear 7 has the through hole 28 prolonged in the rotation axis direction, and the first cylindrical part 31 surrounding the circumference of the through hole 28 in the circumference direction. The first cylindrical part 31 corresponds to a first fitting part (pipe part) which is fitted to the outer periphery of the second cylindrical part 32 of the joint 8.

The joint 8 has the second cylindrical part 32 which is fitted and inserted to the through hole 28 so as to be relatively rotatable relative to the first cylindrical part 31 of the output gear 7. The second cylindrical part 32 corresponds to a second fitting part (shaft part) which is fitted to the inner circumference of the first cylindrical part 31 of the output gear 7.

The output gear 7 and the joint 8 respectively have a first opposing face and a second opposing face opposing with each other in a radial direction which intersects perpendicularly to the rotation axis direction of the coupling mechanism.

The first opposing face of the output gear 7 is an inner circumference face of the first facing part 26 and the first cylindrical part 31. The second opposing face of the joint 8 is an outer circumference face of the second cylindrical part 32. The output gear 7 and the joint 8 are assembled with each other at a fitting position shown in FIG. 2.

Figure 5:
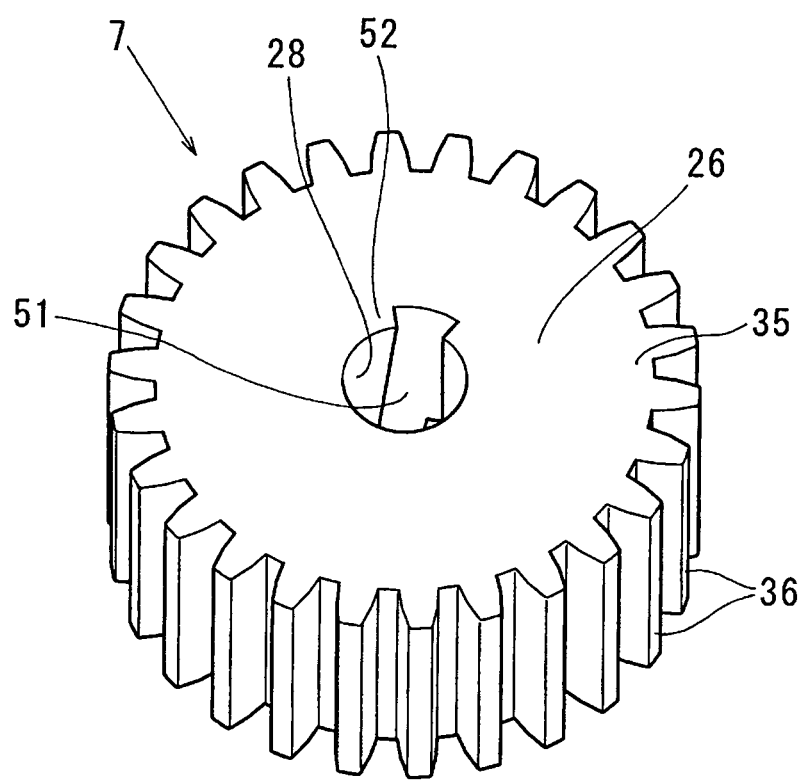
FIG. 5 is a perspective view illustrating an output gear of the power transmission device.
Figure 6A:
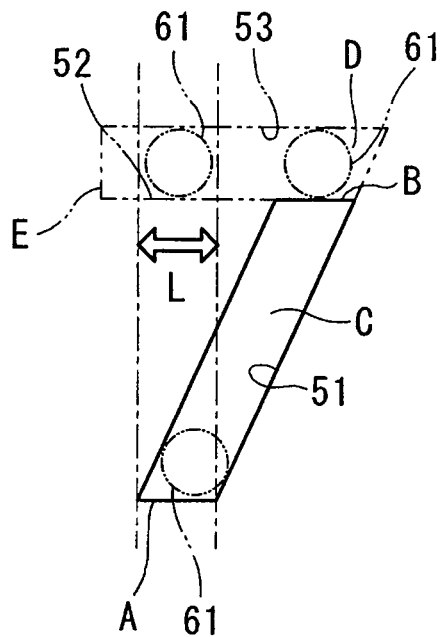
FIG. 6A is an explanatory view illustrating a groove and a lock part of the output gear and FIG. 6B is an explanatory view illustrating a manufacture method of the output gear.

As shown in FIGS. 5, and 6A, an engagement groove (recess) 51 is defined in the inner circumference surface of the first facing part 26 and the first cylindrical part 31 of the output gear 7, and has a partial spiral shape extending in a twist direction centering on the rotation axis direction of the coupling mechanism. The groove 51 is a recess recessed from the inner circumference surface of the first facing part 26 and the first cylindrical part 31 outward in the radial direction. Moreover, the engagement groove 51 can be engaged with an engagement pin 61 that is movable in the groove 51. The groove 51 of this embodiment is straightly extended in a direction which inclines to the rotation axis direction of the coupling mechanism.

The groove 51 is described with reference to FIG. 6A. The groove 51 is defined to extend from a first end "A" to a second end "B" in the extending direction of the groove 51. The groove 51 is defined to have a middle point "C" at the middle between the first end A and the second end B. The groove 51 has an extending range from the first end A through the middle point C to the second end B in the inclined direction.

The first end A is open in an end surface (valve side) of the first cylindrical part 31 of the output gear 7 in the rotation axis direction. The second end B is open in the other end surface (motor side) of the first cylindrical part 31 of the output gear 7 in the rotation axis direction.

The output gear 7 has a lock part 52 extending from the second end B of the groove 51 in the rotation direction (circumference direction) around the rotation axis of the coupling mechanism in the first facing part 26 and the other end surface of the first cylindrical part 31. The lock part 52 partially surrounds the circumference of the through hole 28 in a curved shape from the second end B of the groove 51. The lock part 52 is formed on the same flat surface or the same circumference.

As shown in FIG. 6A, a lock groove 53 may be extended in the rotation direction from the second end B of the groove 51, and the lock part 52 may be formed by a side face of the lock groove 53. In this case, when the lock part 52 is defined to have a start point "D" and an end point "E", the position of the start point D corresponds to the second end B of the groove 51, and the position most far from the second end B of the groove 51 in the lock part 52 correspond to the end point E of the lock part 52. Further, when the lock part 52 is defined to have an extending range from the start point D to the end point E in the rotation direction, the start point D of the extending range of the lock part 52 is located on the extension of the second end B of the groove 51.

Moreover, when the engagement pin 61 has a first position at which the pin 61 can lock the lock part 52, the first position is, for example, a position corresponding to the first end A of the groove 51 to which the pin 61 is fitted (that is located on the same axis parallel to the rotation axis direction of the coupling mechanism). For example, the first position is an original position to which the pin 61 is returned by the elastic restoring force of the elastic parts 41 and 42 that have twisting deformation at the assembling time.

In a case where the output gear 7 made of synthetic resin (thermoplastic resin) is manufactured with injection molding, it is difficult to form the engagement groove 51 and the lock groove 53 on a wall surface (inner circumference surface of the first facing part 26 and the first cylindrical part 31) of the through hole 28 of the output gear 7.

The injection molding is a method of molding resin, in which pellet type resin material is melted with heat, the melted resin is injected and poured into a cavity in a metal mold with pressure, and the injected resin is cooled and solidified to be taken out of the cavity of the metal mold.

Figure 6B:
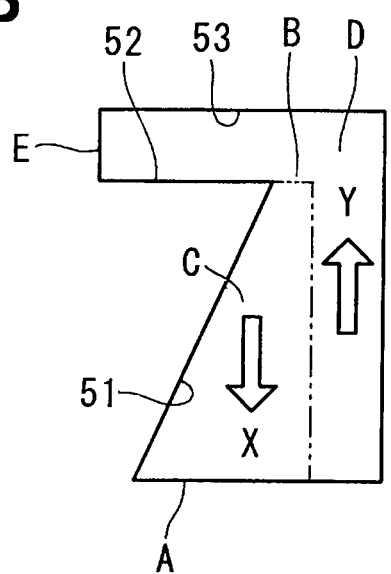

In this embodiment, the metal mold is divided into two parts. One of the two parts is used for forming the engagement groove 51, and is moved in an arrow direction X shown in FIG. 6B. The other is used for forming the lock groove 53, and is moved in an arrow direction Y shown in FIG. 6B that is opposite from the arrow direction X. Thus, the output gear 7 can be manufactured with the injection molding. In addition, the engagement groove 51 is formed to have a trapezoid shape in this case, and a double chain line of FIG. 6B represents a parting line of the metal mold divided into the two parts.

As shown in FIG. 3, the base plate 37 and the sleeve 38 are integrally formed with the joint 8. Similarly to the second facing part 27 and the second cylindrical part 32, the press-fit hole 29 is defined in the sleeve 38, and the insertion part 18 of the shaft 3 is fitted into the hole 29. Thereby, the joint 8 is connected with the shaft 3 so that integral rotation is possible (relative rotation is impossible).

The both ends of the press-fit hole 29 in the rotation axis direction are open. That is, the press-fit hole 29 is a through hole penetrating the joint 8 in the rotation axis direction so that the upper end surface of the second cylindrical part 32 and the lower end surface of the sleeve 38 communicate with each other through the hole 29.

When the output gear 7 and the rubber cushion 9 are assembled to the joint 8, the output gear 7 is rotated relative to the joint 8, thereby twisting each elastic parts 41 and 42 of the rubber cushion 9. At this time, the engagement pin 61 of the joint 8 can continuously engage with the engagement groove 51 from the first end A to the second end B. When the engagement pin 61 reaches the lock part 52 from the second end B of the groove 51, the pin 61 moves (is rotatively displaced) to the position at which the lock part 52 can be locked by the elastic restoring force of each elastic parts 41 and 42 of the rubber cushion 9.

The engagement pin 61 has a pillar (pin) shape projected outward in the radial direction from the outer circumference surface of the second cylindrical part 32 of the joint 8. The engagement pin 61 is projected outward from the outer circumference surface at a position between two of the first protrusions 33 of the output gear 7 in the radial direction so as to be located, for example, above the second protrusion 34 or the first protrusion 33. The engagement pin 61 passes through the engagement groove 51 from the first end A to the second end B through the middle point C at the assembling time of the coupling mechanism, as mentioned above.

When the cushion 9 absorbs an impact (load) applied to the output gear 7 or the joint 8, the elastic parts 41, 42 of the cushion 9 compressingly deform and have a displacement amount in the twist direction centering on the rotation axis direction. The displacement amount in the twist direction (L shown in FIG. 6A) is set to be smaller than an angular range defined from a first position of the pin 61 to a second position of the pin 61 in the twist direction. The pin 61 is able to lock the lock part 52 at the first position, and is able to be fitted with the groove 51 at the second position (corresponding to the start point D).

Next, the assembling method of the coupling mechanism of the power transmission device is explained.

The rubber cushion 9 is arranged on the second cylindrical part 27 of the joint 8 by inserting the fitting concave 46 of the rubber cushion 9 into the second protrusion 34 of the joint 8, as a first process of the assembling method.

Next, a position alignment of the pin 61 is conducted relative to the first end A of the groove 51. The first cylindrical part 31 of the output gear 7 is fitted to the outer periphery of the second cylindrical part 32 of the joint 8 in a manner that the first protrusion 33 of the output gear 7 fits into the fitting concave 45 of the rubber cushion 9. That is, the first cylindrical part 31 of the output gear 7 and the second cylindrical part 32 of the joint 8 are fitted with each other to sandwich the rubber cushion 9 between the output gear 7 and the joint 8.

At this time, the pin 61 arranged on the periphery of the second cylindrical part 32 of the joint 8 is inserted (fitted) from the first end A of the groove 51 that is defined in the inner circumference surface of the first cylindrical part 31 of the output gear 7. Next, the output gear 7 is rotated relative to the joint 8, before the pin 61 reaches the second end B of the groove 51 through the middle point C, to the position at which the pin 61 passes toward the lock part 52 from the second end B of the groove 51.

Therefore, the elastic parts 41 and 42 of the rubber cushion 9 are compressingly deformed in the twist direction. (At this time, the twist direction is approximately the same or corresponds to the circumference direction around the rotation axis direction of the coupling mechanism). Thereby, the output gear 7 and the rubber cushion 9 are integrally assembled to the joint 8, as a second process of the assembling method.

Operation of a tumble control valve device (TCV) will be briefly described.

The ECU determines whether the tumble flow in the combustion chamber should be strengthened or not based an engine operation status such as engine rotation speed (number) or engine load (accelerator opening or throttle opening).

For example, a demanded tumble ratio is calculated based on the engine operation status such as engine rotation velocity and engine load. When the demanded tumble ratio is equal to or higher than a specified value, the plate valves 2 are fully opened. When the demanded tumble ratio is lower than the specified value, the plate valves 2 are fully closed.

The ECU controls electricity supplied to the motor M (e.g., energizes the motor M) when the ECU determines that the tumble flow in the combustion chamber should be strengthened. At this time, the power transmission device is activated, therefore the coupling mechanism and the rotary shaft 3 are driven to a closing direction by utilizing torque of the motor M. Hence, the valves 2 are closed, i.e., the first intake passages 11 are fully closed by closing the valves 2.

When the valves 2 are closed, intake air flowing into the duct 1 from the throttle body or the surge tank passes through the second intake passages 12, and is introduced into an upper layer of the intake port of the cylinder head from an inside of the duct 1 (the second intake passages 12). Then, the intake air becomes a deflected flow flowing along a wall face of the upper layer of the intake port, and is supplied to the combustion chambers through openings of the intake ports. At this time, intake vortex flows are generated in the combustion chambers of the cylinders of the engine. Thus, combustion efficiency in the combustion chambers is improved when the engine starts or is in idling. Accordingly, for example, fuel efficiency and emission reduction (e.g., Hydrocarbon reduction effect) are enhanced.

In a case where transmission of torque is impulsively operated, when one of the two protrusion line parts of the joint 8 bumps into the fully-close stopper, the elastic parts 41 and 42 of the cushion 9 are compressively deformed in the twist direction. The protrusion line parts are formed integrally with the joint 8 which is integrally and rotatably coupled with the rotary shaft 3 and the valves 2. Hence, the impulsive load transmitted to the worm gear 4, which is fixed to the output shaft (motor shaft) of the motor M, can be absorbed by the cushion 9. Therefore, occurrence of a screw tightening state (worm lock) of the worm gear 4 is prevented.

While the motor M is working, the elastic parts 41 and 42 of the cushion 9 are compressed and deformed by the torque of the motor M. Thus, because of a reactive force from the cushion 9, backlashes between the worm gear 4 and the helical gear 5 and between the spur gear 6 and the output gear 7 can be filled. Accordingly, the vortex flow generating device has a self-locking effect of the worm gear 4, which works when the motor M is stopped, and flap of the valves 2 is prevented regardless of whether the motor M is working.

When abnormal pressure such as backfire pressure is occurred, the joint 8 may be separated from the output gear 7, which meshes with the spur gear 6, because the elastic parts 41 and 42 of the cushion 9 are deflected to resist the abnormal pressure on the valves 2. Hence, the valves 2 which interlock with the rotary shaft 3 can be rotated from the fully-close state toward the fully-open state depending on an abnormal load on the valves 2 in the fully-close state, namely, depending on an impulsive load of the abnormal pressure. Accordingly, even when the valves 2 are subjected to the abnormal pressure such as the backfire pressure, a part of the vortex flow generating device can be not damaged and intake vortex flows can be generated in the combustion chambers.

According to the first embodiment, the engagement pin 61 is projected outward in the radial outside from the peripheral surface of the second cylindrical part 32 of the joint 8, and the engagement groove 51 is defined in the inner circumference surface of the first cylindrical part 31 of the output gear 7 (the wall surface of the through hole 28). The pin 61 can be engaged with the groove 51 that extends in the inclined direction inclined to the rotation axis direction of the coupling mechanism. Furthermore, the lock part 52, which is locked by the pin 61, is defined in the other end face of the first facing part 26 and the first cylindrical part 31 of the output gear 7.

When the first cylindrical part 31 of the output gear 7 and the elastic parts 41 and 42 of the rubber cushion 9 are fitted with the second cylindrical part 32 and the fitting concave 39 of the joint 8, the output gear 7 is rotated relative to the joint 8 in a manner that the pin 61 engages the groove 51 from the first end A to the second end B through the middle point C, so as to integrally assemble the output gear 7, the rubber cushion 9 and the joint 8. Meanwhile, the pin 61 passes from the second end B of the groove 51 toward the lock part 52.

At this time, the elastic parts 41 and 42 of the rubber cushion 9 are compressingly deformed in the twist direction centering on the rotation axis direction of the coupling mechanism when the output gear 7 is rotated relative to the joint 8.

When the compressive stress generated by the deformation of the elastic parts 41 and 42 of the rubber cushion 9 is released, the output gear 7 rotates relative to the joint 8 in a direction opposite from the twist direction of the elastic parts 41 and 42, due to elastic restoring force of the elastic parts 41 and 42 of the rubber cushion 9. At this time, the pin 61 is returned to the original position at which the lock part 52 can be locked in the circumference direction.

Thereby, the pin 61 can restrict a relative movement of the output gear 7 and the rubber cushion 9 relative to the joint 8 in the rotation axis direction of the coupling mechanism. Therefore, disassembling of the coupling mechanism or position deviation among the output gear 7, the joint 8, and the rubber cushion 9 can be prevented at transportation time, assembling time or operation time.

Moreover, the output gear 7 and the rubber cushion 9 can be restricted from slipping off the joint 8 only by the simple structure (the pin 61 and the lock part 52) defined between the output gear 7 and the joint 8. That is, the slip off stop mechanism is realizable at low cost.

Moreover, the displacement amount of the rubber cushion 9 in the twist direction centering on the rotation axis direction of the coupling mechanism at the impact absorption time is set to become smaller than the angular range L in the twist direction. The angular range L is defined from the first position, at which the lock part 52 can be locked by the pin 61, to the second position (start point D), at which the pin 61 can be fitted with the groove 51. Thus, the disassembling can be prevented.

If the output gear 7 falls out from the joint 8, or if positioning gap of the output gear 7 is generated from the regular position relative to the second cylindrical part 32 of the joint 8, a clearance between the actuator case (gear housing 22 accommodating the output gear 7, the joint 8, and the rubber cushion 9 which are assembled into one component) and the first facing part 26 and the first cylindrical part 31 of the output gear 7 becomes smaller, in this case the output gear 7 may not be able to work normally. However, according to the first embodiment, the output gear 7 can be prevented from falling out from the joint 8, so that the output gear 7 can work normally.

Figure 8:
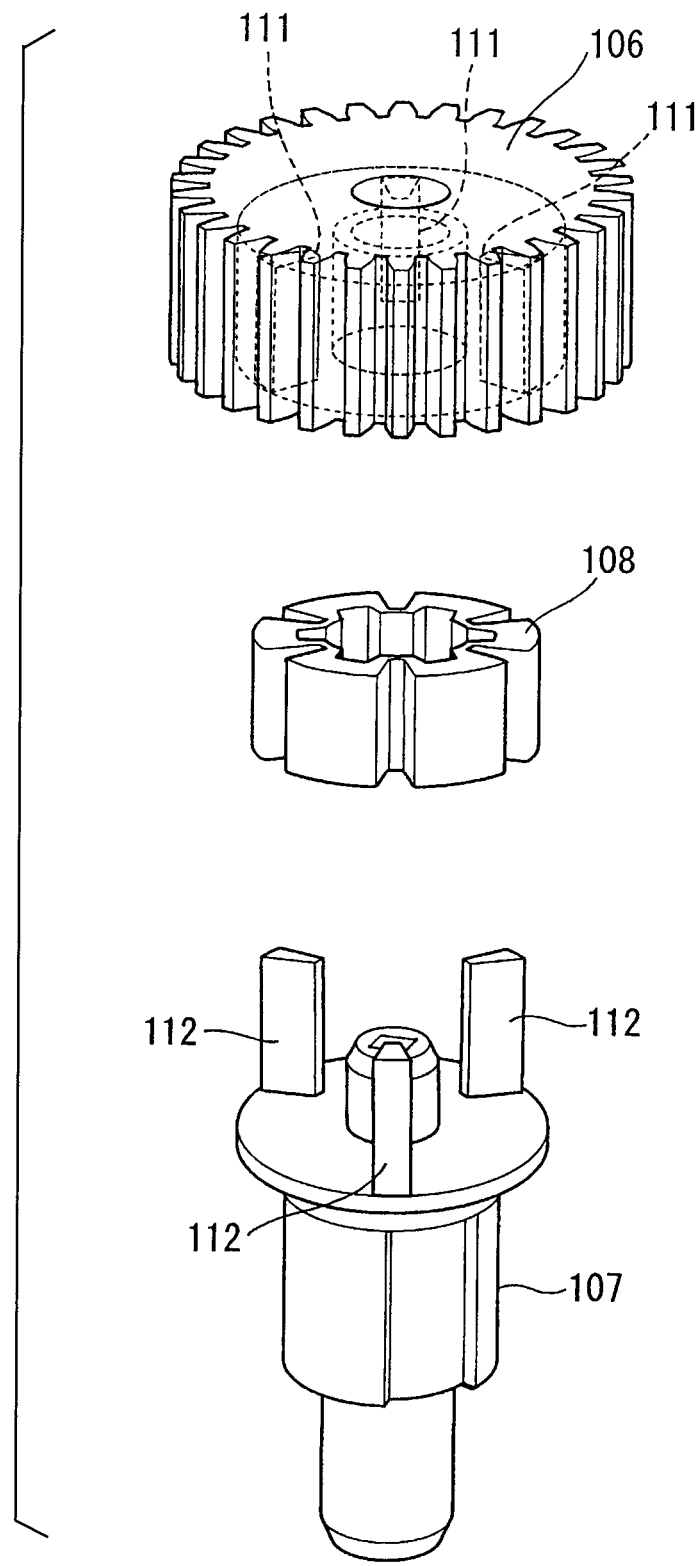
FIG. 8 is a disassembled perspective view illustrating a power transmission device of a comparison example.

A comparison example is described with reference to FIG. 8. A power transmission device of the comparison example includes an output gear 106, a joint 107 and a rubber cushion 108, without an engagement pin and an engagement groove. The output gear 106 is driven to rotate by a motor. The joint 107 is press-fitted to an outer periphery of a shaft that supports a valve. An accommodation space is defined between a convex portion 111 of the output gear 106 and a convex portion 112 of the joint 107, and the rubber cushion 108 is received in the accommodation space. The rubber cushion 108 absorbs impact torque (load).

The output gear 106 and the rubber cushion 108 need to rotate around a rotation axis of the joint 107. Further, the rubber cushion 108 is compressed and deformed in a tangential direction because the projection 111, 112 projects outward in a radial direction centering on the rotation axis of the joint 107. In this comparison example, if the output gear 106 and the rubber cushion 108 are moved to one side (upward in FIG. 8) in the rotation axis direction at operation time or transportation time, the components constructing the power transmission device may be disassembled.

In contrast to the comparison example, according to the first embodiment of the present disclosure, the output gear 7, the joint 8 and the rubber cushion 8 can be restricted from being disassembled, due to the engagement between the groove 51 of the output gear 7 and the pin 61 of the joint 8.

(Second Embodiment)

A second embodiment will be described with reference to FIGS. 7A and 7B which illustrate modification examples of the groove 51.

The engagement groove 51 and the lock groove 53 are defined in the inner circumference surface (wall surface of the through hole 28) of the first cylindrical part 31 of the output gear 7. The engagement groove 51 partially spirally extends in the inclined direction inclined to the rotation axis direction of the coupling mechanism. The lock groove 53 defining the lock part 52 extends from the second end B of the groove 51 in the circumference direction around the rotation axis of the coupling mechanism.

Figure 7A:
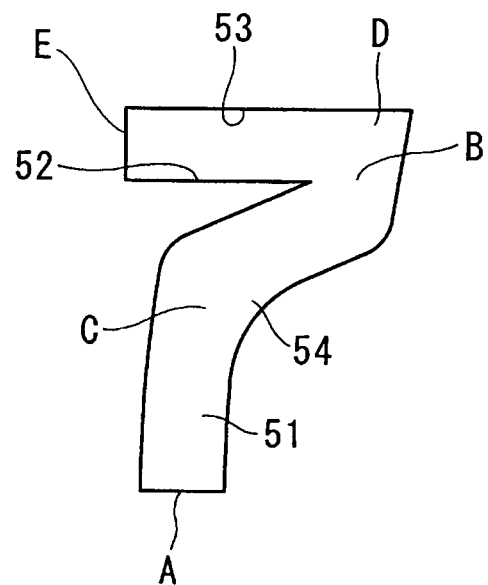
FIG. 7A is an explanatory view illustrating a groove and a lock part of an output gear of a power transmission device according to a second embodiment.

As shown in FIG. 7A, the groove 51 may have a bending part 54 circularly curved at a point between the first end A and the second end B.

Figure 7B:
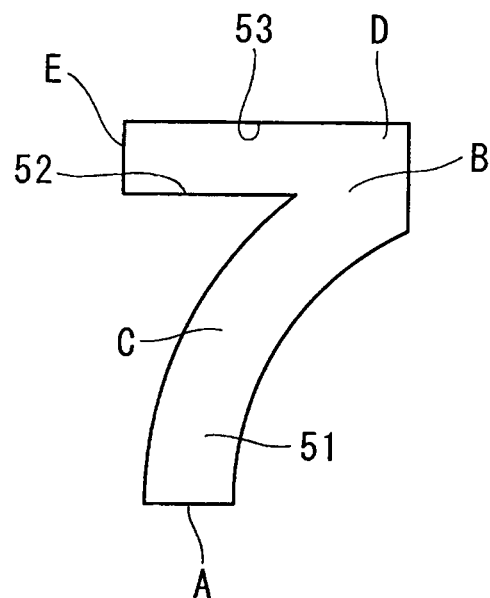
FIG. 7B is an explanatory view illustrating a groove and a lock part of an output gear of a power transmission device according to a second embodiment.

As shown in FIG. 7B, the groove 51 may be continuously bent from the first end A to the second end B through the middle point C.

(Modifications)

The present disclosure may be applied to a power transmission device that drives to rotate a shaft of a rotative device such as compressor, blower or pump using rotative power obtained from an engine or a motor.

In the above-described embodiments, the output gear 7 corresponds to the first rotation member, and the joint 8 corresponds to the second rotation member. However, the first rotation member may be the joint 8, which is located on a driven side (valve side), and the second rotation member may be the output gear 7, which is located on a driving side (motor side).

The present disclosure may applied to a swirl flow generating device instead of the tumble flow generating device. The swirl flow generating device generates a swirl flow in a lateral direction, while the tumble flow generating device generates a tumble flow in a vertical direction. Moreover, the present disclosure may be applied to an air intake device constructed to be capable of generating a squish vortex for promoting combustion of the engine.

The present disclosure may be applied to a throttle device that controls the flow rate of intake air drawn into the combustion chamber or a variable intake system which changes the length and the cross-sectional area of the intake passage.

The present disclosure may be applied to a power transmission device which drives a valve of an exhaust control valve which controls exhaust gas (including EGR gas) discharged from the combustion chamber.

The engagement groove 51 and the lock groove 53 construct a crook shape, and the twist direction is one side in the circumference direction. The twist direction may be made the other side in the circumference direction, and the crook shape may be modified in such a manner.

The curvature radius of the groove 51 and the curvature radius of the bending part 54 may be made larger or smaller than the examples shown in FIGS. 7A and 7B. Moreover, an intersection angle between the engagement groove 51 and the lock part 52 may be made more acute or obtuse.

Such changes and modifications are to be understood as being within the scope of the present disclosure as defined by the appended claims.

What is claimed is:

1. A power transmission device that transmits a rotation power from a drive source to a driven object, the power transmission device comprising:
    a first rotation member and a second rotation member coaxially arranged to rotate in a circumference direction around a rotation axis relative to each other; and
    an impact absorber made of rubber and arranged between the first rotation member and the second rotation member to have elastic deformation in a twist direction centering on the rotation axis, wherein
    the first rotation member has
        a recess continuously extending in a direction inclined to the rotation axis from a first end to a second end, and
        a lock part extending in the circumference direction from the second end of the recess,
    the second rotation member has
        a projection configured to be engaged with the recess continuously from the first end of the recess to the second end of the recess, the projection being locked with the lock part when the projection moves to the lock part from the second end of the recess.

2. The power transmission device according to claim 1, wherein
    the first rotation member further has
        a through hole extending in the rotation axis, and
        a first fitting part surrounding the through hole, and
    the second rotation member further has
        a second fitting part fitted to the through hole so as to be rotatable relative to the first fitting part.

3. The power transmission device according to claim 1, wherein
    the impact absorber has a displacement amount in the twist direction when the impact absorber has the elastic deformation by absorbing an impact, and
    the displacement amount is set to be smaller than an angular range defined from a first position of the projection to a second position of the projection in the twist direction, the projection being able to lock the lock part at the first position, the projection being able to be fitted with the recess at the second position.

4. The power transmission device according to claim 1, wherein
    the first rotation member has a plurality of first protrusions,
    the second rotation member has a plurality of second protrusions, and
    the first protrusions and the second protrusions are alternately located in the circumference direction.

5. The power transmission device according to claim 4, wherein
    the first rotation member has a first facing part, and the second rotation member has a second facing part that is opposite to the first facing part to have a predetermined accommodation space therebetween,
    the accommodation space accommodates the impact absorber, and the first protrusions project from the first facing part toward the second facing part, and the second protrusions project from the second facing part toward the first facing part.

6. The power transmission device according to claim 4, wherein
the impact absorber includes a plurality of elastic parts which are respectively inserted and located between the first and second protrusions that are adjacent to each other in the circumference direction.

7. The power transmission device according to claim 6, wherein
the impact absorber includes a connection part which connects adjacent two of the elastic parts adjacent to each other in the circumference direction.

8. The power transmission device according to claim 1, wherein
the first rotation member has a first opposing face, and the second rotation member has a second opposing face,
the first opposing face and the second opposing face oppose with each other in a radial direction perpendicular to the rotation axis, the recess is a groove recessed in the radial direction from the first opposing face, and
the projection is a pin projecting in the radial direction from the second opposing face.

9. The power transmission device according to claim 1, further comprising:
a casing, wherein the first rotation member, the second rotation member and the impact absorber are integrated into an integrated component, and the casing receives the integrated component.

10. An assembling method of the power transmission device according to claim 1, the assembling method comprising:
performing a position alignment of the projection of the second rotation member relative to the first end of the recess of the first rotation member, and
rotating the first rotation member and the second rotation member relative to each other before the projection reaches the lock part from the second end of the recess so as to integrally assemble the first rotation member, the second rotation member and the impact absorber.

* * * * *